(12) United States Patent
König

(10) Patent No.: US 12,515,517 B2
(45) Date of Patent: Jan. 6, 2026

(54) AIR GUIDING DEVICE OF A MOTOR VEHICLE BODY OF A MOTOR VEHICLE

(71) Applicant: Dr. Ing. h.c. F. Porsche Aktiengesellschaft, Stuttgart (DE)

(72) Inventor: Oliver König, Fellbach (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 337 days.

(21) Appl. No.: 18/142,099

(22) Filed: May 2, 2023

(65) Prior Publication Data
US 2023/0391184 A1    Dec. 7, 2023

(30) Foreign Application Priority Data

Jun. 3, 2022 (DE) ............... 10 2022 114 062.8

(51) Int. Cl.
*B60K 11/08* (2006.01)

(52) U.S. Cl.
CPC .................. *B60K 11/085* (2013.01)

(58) Field of Classification Search
CPC .................................................. B60K 11/085
USPC ..................................................... 180/68.1
See application file for complete search history.

(56) References Cited

U.S. PATENT DOCUMENTS

| | | | |
|---|---|---|---|
| 4,753,288 A | 6/1988 | Harvey | |
| 5,732,666 A * | 3/1998 | Lee | B60K 11/085 |
| | | | 123/41.05 |
| 7,757,643 B2 * | 7/2010 | Harich | B60K 11/085 |
| | | | 123/41.04 |
| 7,866,737 B2 * | 1/2011 | Browne | F24F 13/15 |
| | | | 49/82.1 |
| 8,505,660 B2 * | 8/2013 | Fenchak | B60K 11/085 |
| | | | 180/68.1 |
| 8,550,887 B2 * | 10/2013 | Walters | F01P 7/10 |
| | | | 454/155 |
| 9,751,379 B2 * | 9/2017 | Weiss | F01P 11/10 |
| 10,144,378 B2 | 12/2018 | Goldsberry et al. | |
| 2007/0077880 A1 * | 4/2007 | Lee | H05K 7/20172 |
| | | | 454/285 |
| 2011/0070817 A1 * | 3/2011 | Walters | F01P 7/10 |
| | | | 454/155 |
| 2011/0073395 A1 * | 3/2011 | Lee | F01P 7/12 |
| | | | 180/68.1 |
| 2012/0074729 A1 * | 3/2012 | Fenchak | B60K 11/085 |
| | | | 296/193.1 |

FOREIGN PATENT DOCUMENTS

| | | |
|---|---|---|
| DE | 19742730 A1 | 4/1998 |
| EP | 2335963 A1 | 6/2011 |

* cited by examiner

*Primary Examiner* — Hau V Phan
(74) *Attorney, Agent, or Firm* — Buchanan Ingersoll & Rooney PC

(57) ABSTRACT

An air guiding device of a motor vehicle body of a motor vehicle includes a slat assembly. The slat assembly possesses at least two slats which are arranged in a frame of the air guiding device in a manner which permits them to rotate around their rotational axis. To avoid deformation of the slat assembly, the slat assembly includes at least one support element, which extends along the rotational axis.

20 Claims, 5 Drawing Sheets

AIR GUIDING DEVICE OF A MOTOR VEHICLE BODY OF A MOTOR VEHICLE

CROSS-REFERENCE TO RELATED APPLICATION

This application claims priority to German Patent Application No. 10 2022 114 062.8, filed Jun. 3, 2022, the content of such application being incorporated by reference herein in its entirety.

FIELD OF THE INVENTION

The invention relates to an air guiding device of a motor vehicle body of a motor vehicle.

BACKGROUND OF THE INVENTION

Air guiding devices used to influence an air flow around and/or through the motor vehicle body are known. Air guiding devices are thus used in the front region of the motor vehicle body, wherein they allow a defined air flow to be achieved in the front region of the motor vehicle body, e.g., for a flow of air into a cooling unit of the motor vehicle, or for cooling the brakes of the motor vehicle.

Flow channels of the air guiding devices in the front region equipped with a slat assembly are known, the slat assembly preferably being movable, so that the inlet opening formed in the front region of the motor vehicle body is variable and therefore controllable with the aid of the air guiding device. A flow cross-section of the flow channel can thus be changed with the aid of the slat assembly, for example, so that an air resistance coefficient and an energy demand of the motor vehicle depending on the air resistance coefficient can be reduced, which, for example, increases the range of the motor vehicle. Individual slats of the slat assembly are connected with the aid of a common push rod, which is typically moved in the axial direction to initiate a common rotational movement of the slats. The slats are held in a frame of the slat assembly in such a manner that they can rotate. A deformation of the frame occurring along a rotational axis of the slats is possible, for example during assembly or during operation, which must be stabilized.

From the patent EP 2 335 963 B1, which is incorporated by reference herein, an air guiding device of a motor vehicle body of a motor vehicle in whose slat assembly adjustable horizontally aligned slats are movable in a frame is known. The frame has several crosspieces extending along a vertical body axis of the motor vehicle body, which serve to support the slats in such a manner that they can rotate.

A motor vehicle body of a motor vehicle is disclosed in U.S. Pat. No. 10,144,378 B2, which is incorporated by reference herein, possessing a front part with a central air inlet opening, wherein several support struts extending along a vertical body axis of the motor vehicle body are arranged in the air inlet opening.

SUMMARY OF THE INVENTION

An air guiding device of a motor vehicle body of a motor vehicle according to aspects of the invention comprises a slat assembly having at least two slats, which are arranged in a frame of the air guiding device in a manner which permits them to rotate around their rotational axis. According to the present invention, to avoid deformation of the slat assembly, the latter includes at least one support element which is configured to extend along the rotational axis. Deformation of the slat assembly by, for example, compression or collapse of the frame realized by forces acting on the frame can occur both during the assembly of the slat assembly into the motor vehicle body and as a result of flow forces during the operation of the motor vehicle. One advantage is that the frame becomes dimensionally stable with the aid of the support element so that deformation is avoided. Dimensional stability against disintegration of the slat assembly prior to its installation in the body is a further advantage. Overall, the air guiding device is thus secured and stable.

In a preferred configuration, the slats are vertically arranged, wherein their rotational axis extends along a vertical body axis.

A simple rotatable positioning of the slat is achieved, provided that the support element is arranged to receive the rotational axis and/or the slat is configured to brace itself against the support element.

Insofar as a connection between the slat and the support element and/or the connection of the support element to the frame involves the use of snap-fit connections, cost-effective manufacture of the air guiding device can be achieved, since snap-fit connections can generally be assembled in a cost-effective manner.

BRIEF DESCRIPTION OF THE DRAWINGS

Further advantages, features, and details of the invention are shown in the following description of preferred embodiment examples as well as the drawings. The features and feature combinations specified in the foregoing description, as well as the features and feature combinations specified hereinafter in the description of the drawings and/or shown alone in the drawings, are able to be used not only in the respectively indicated combination, but also in other combinations, or on their own, without departing from the scope of the invention. Shown are.

DETAILED DESCRIPTION OF THE INVENTION

Figure 1:
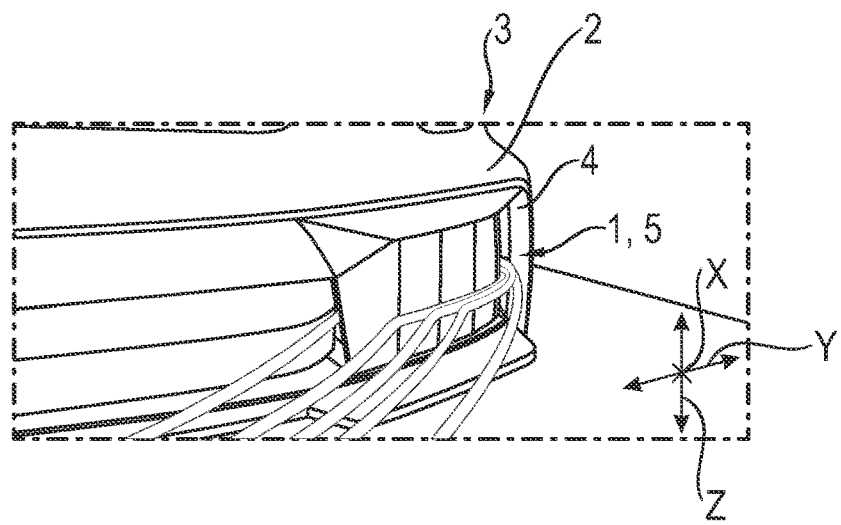
FIG. 1 in a front view, an air guiding device according to aspects of the invention of a motor vehicle body of a motor vehicle in a first embodiment example in a closed position, FIG. 2 in a front view, the air guiding device according to aspects of the invention of the motor vehicle body of the motor vehicle in the first embodiment example in an open position, FIG. 3 in an exploded view, the air guiding device according to aspects of the invention in a second embodiment example, FIG. 4 in a schematic diagram, a bearing point arrangement of a slat assembly of the air guiding device according to aspects of the invention, FIG. 5 in an exploded view, a bearing point of the air guiding device according to aspects of the invention, FIG. 6 in a section along a rotational axis of a slat of the air guiding device according to aspects of the invention, an upper bearing point of the bearing point arrangement, FIG. 7 in a section along the rotational axis of the slat of the air guiding device according to aspects of the invention, a lower bearing point of the bearing point arrangement, FIG. 8 in a perspective view, the air guiding device according to aspects of the invention in the open position, FIG. 9 in a further perspective view, the air guiding device according to aspects of the invention in the open position, FIG. 10 in a perspective view, a cut-out view of the air guiding device according to aspects of the invention, and FIG. 11 in a perspective view, the air guiding device according to aspects of the invention in a partially assembled state.
Figure 2:
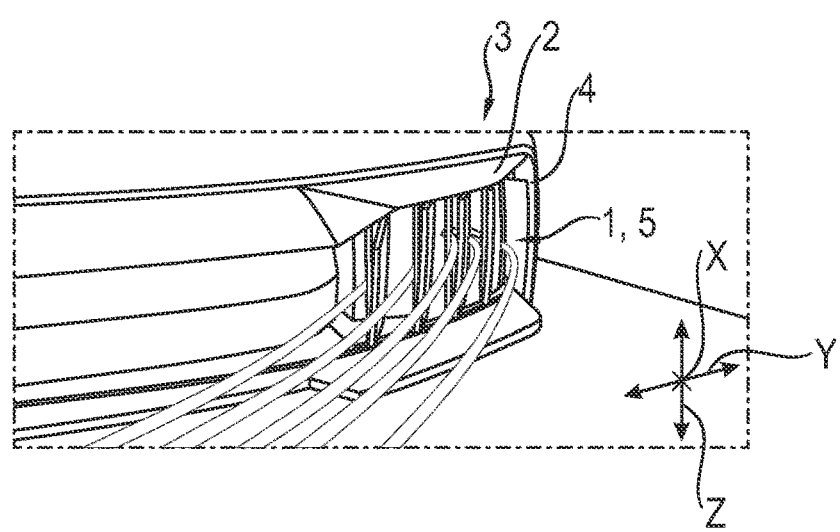

An air guiding device 1 according to aspects of the invention of a motor vehicle body 2 of a motor vehicle 3 in a first embodiment example is embodied as shown in a front view in FIGS. 1 and 2, wherein it is illustrated in a closed position in FIG. 1 and in an open position in FIG. 2. The air guiding device 1 is received in an entry opening 4 of the motor vehicle body 2 and comprises a slat assembly 5 with four slats 6 in the first embodiment example.

Figure 3:
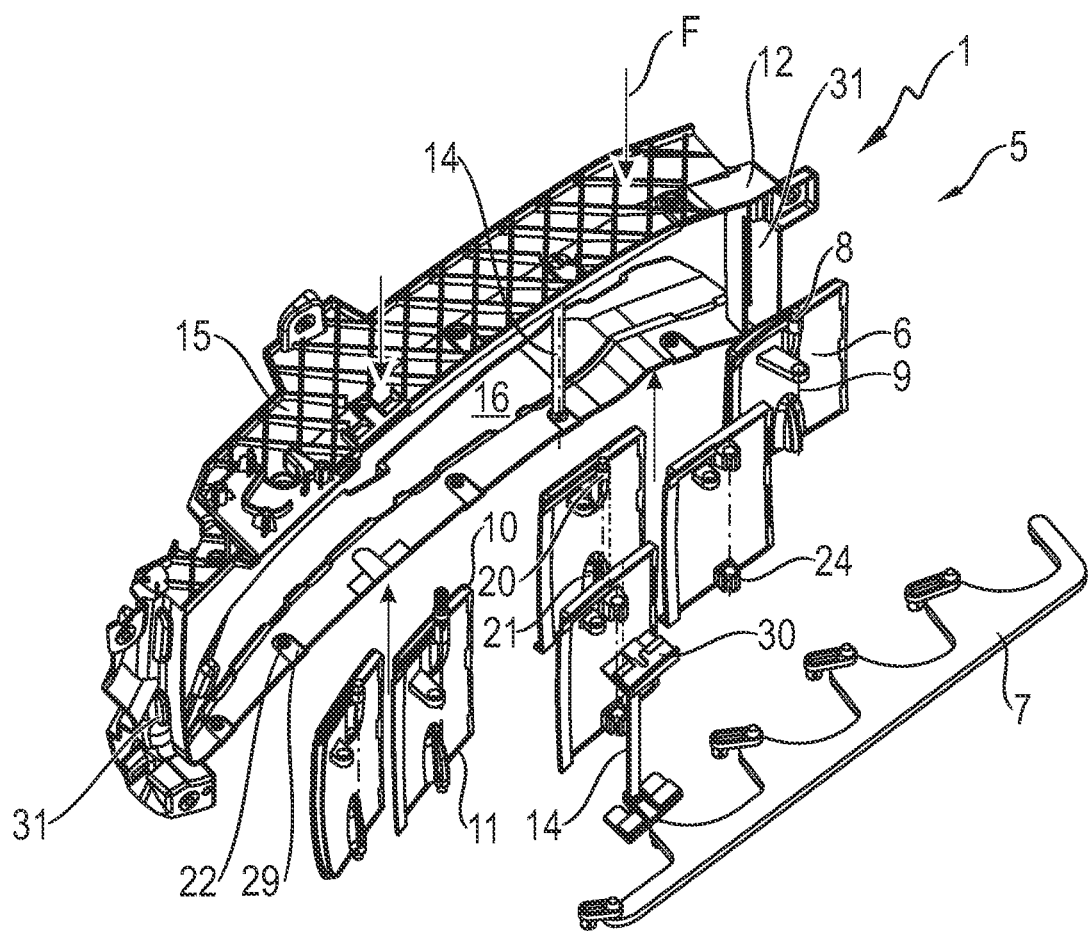
Figure 3:
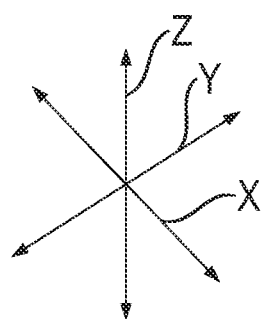

In FIG. 3, the slat assembly 5 of the air guiding device 1 according to aspects of the invention is illustrated in a second embodiment example, which differs from the first embodiment example by the number of slats 6; in the second embodiment example, six slats 6 are associated with the slat assembly 5. The slats 6 are synchronously adjustable with the aid of a pushrod 7 and each possess an axle 8, with which they are connected to the pushrod 7 in a manner that allows them to move.

A movement of the slats 6 consists, in principle, of a rotational movement or a pivoting movement around their rotational axis 9, which lies along their axle 8. The slats 6, which are commonly and in the present embodiment example constructed predominantly in a plate-like design, are rotatably mounted in a frame 12 of the slat assembly 5 at their first end 10 and at their second end 11, which faces away from the first end 10. In this frame 12, the slats 6 are held in a manner that allows them to rotate.

Figure 8:
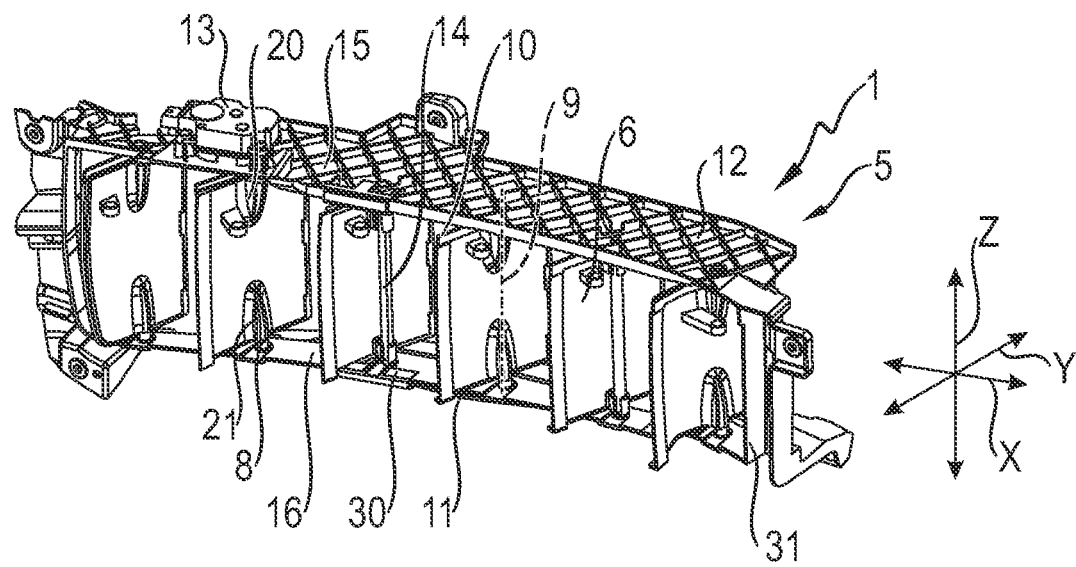
Figure 9:
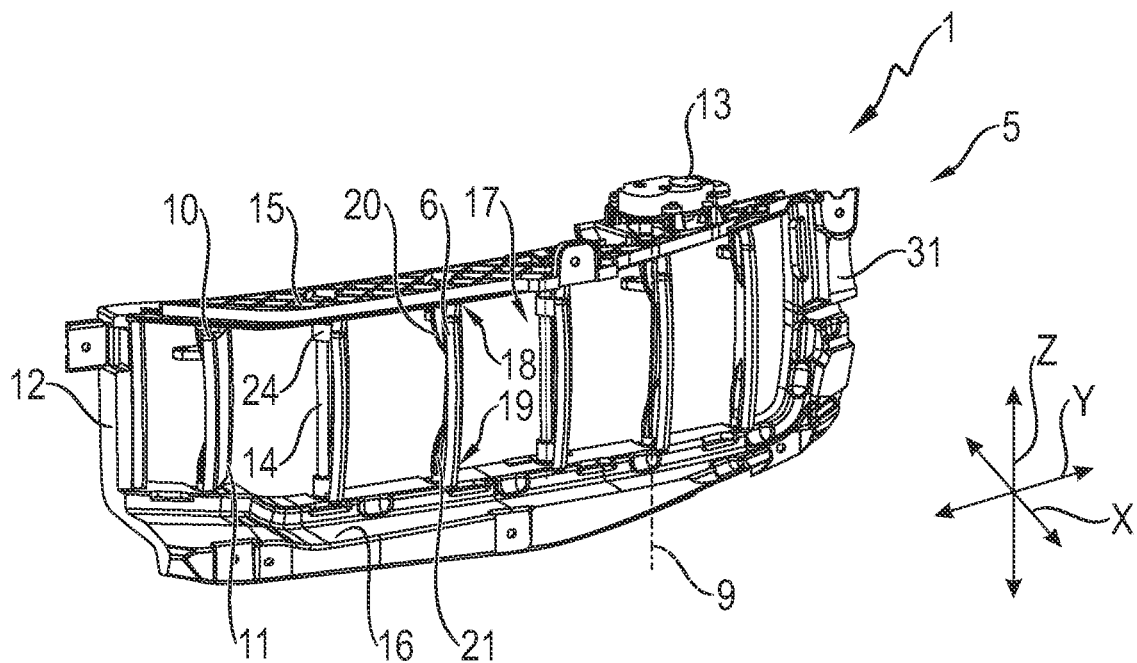
Figure 10:
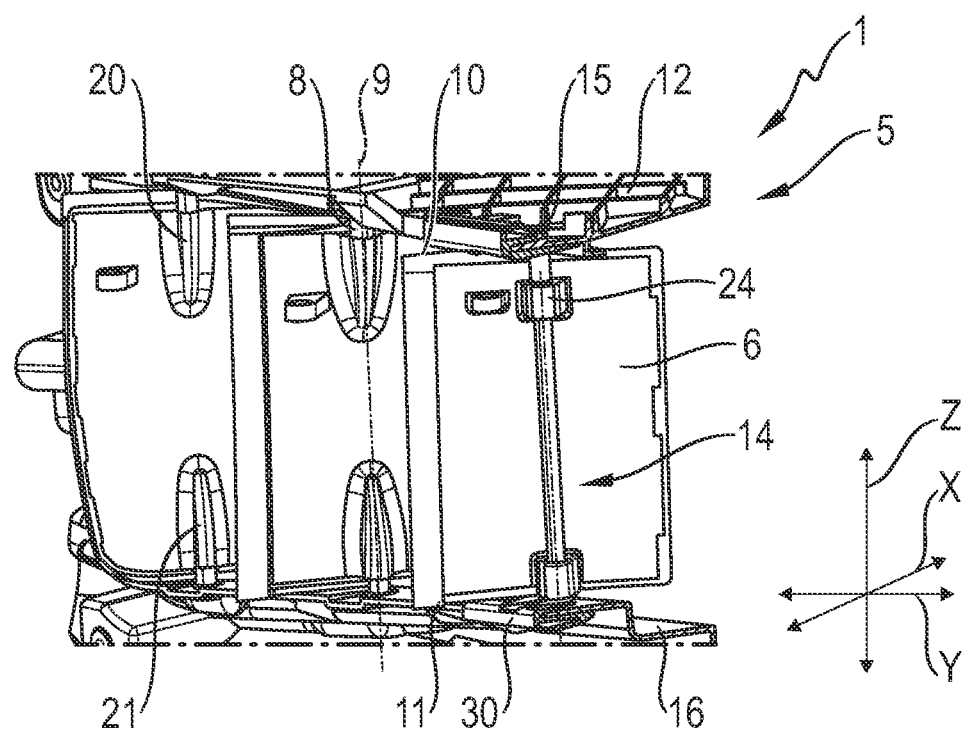
Figure 11:
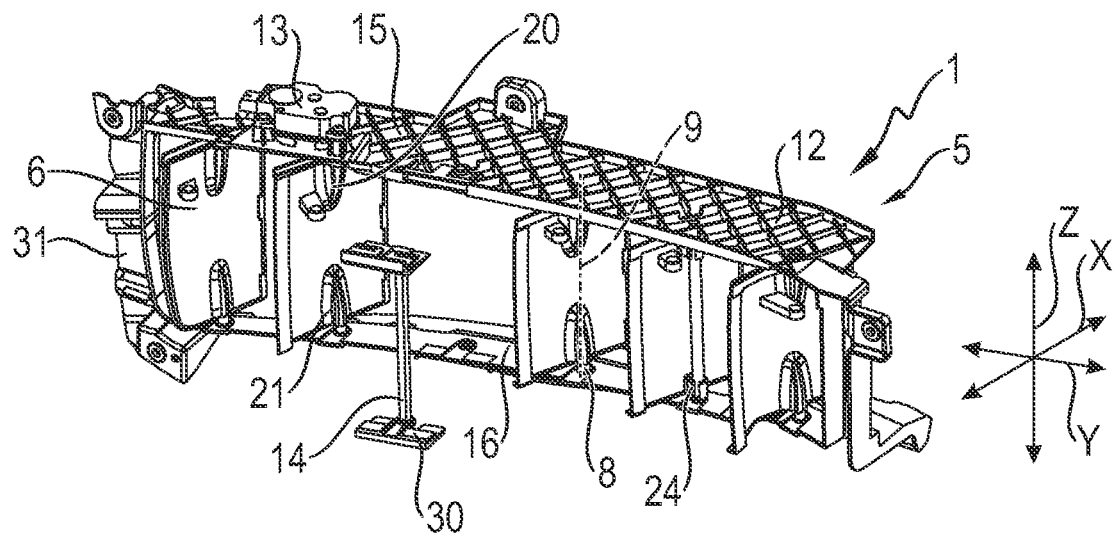

The rotational movement, for which the slats 6 are structured so that they can be synchronously activated, is initiated by an actuator 13 of the air guiding device 1, as illustrated in FIGS. 8, 9 and 11, on one of the slats 6 and transferred to the remaining slats 6 with the aid of the push rod 7.

To avoid deformation of the slat assembly 5 due to forces F acting on the slat assembly 5, in particular along the rotational axis 9, the slat assembly 5 is associated with at least one support element 14; in the present embodiment examples, two support elements 14 are provided, which extend along the rotational axis 9. In other words, the support element 14 is arranged so as to extend between an upper frame element 15 of the frame 12 and a lower frame element 16 of the frame 12 that is opposite to the upper frame element 15, wherein the two frame elements 15, 16 are configured with the aid of two lateral elements 31 to form a frame 12 that is closed along its perimeter.

To provide a clearer explanation, a Cartesian coordinate system is introduced, which identifies a longitudinal body axis X, a transverse body axis Y, and a vertical body axis Z. It is thereby evident that in the present embodiment examples, the slats 6 are oriented extending along the vertical body axis Z. Furthermore, the upper frame element 15 is arranged along the vertical body axis Z when viewed lying above the lower frame element 16. In other words, the slats 6 are vertically arranged, wherein their rotational axis 9 extends along the vertical body axis Z.

Figure 4:
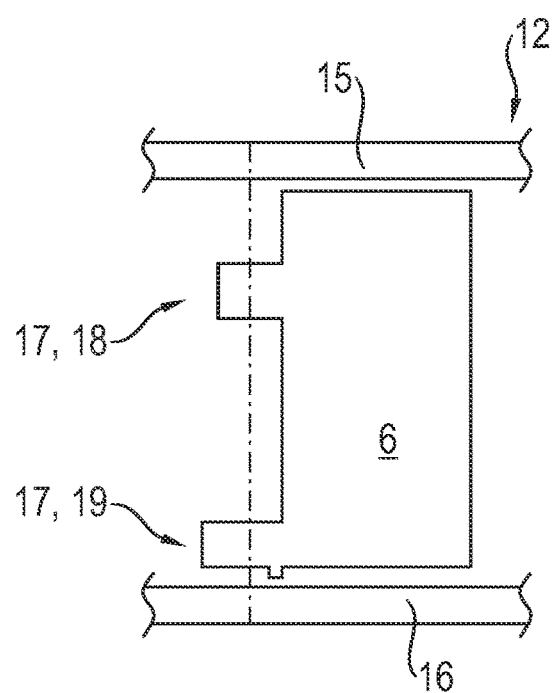

In FIG. 4, a schematic diagram illustrates a bearing point arrangement 17 to connect the slat 6 to the frame 12. In principle, two bearing points, an upper bearing point 18 and a lower bearing point 19, are configured to hold slat 6 in a manner that allows it to rotate. To the extent that the slat 6 is arranged to be supported by the support element 14, the upper bearing point 18 and the lower bearing point 19 are configured between the support element 14 and the slat 6, wherein the bearing point 18; 19 comprises a first bearing element 23 and a second bearing element 24. The first bearing element 23 is associated with the support element 14 and the second bearing element 24 is associated with the slat 6, wherein the bearing point 18; 19 is configured to receive the second bearing element 24 in a rotationally secure and loss-proof manner by the first bearing element 23.

The upper bearing point 18 further serves to establish a connection between the support element 14 and the upper frame element 15, and the lower bearing point 19 further serves to establish a connection between the support element 14 and the lower frame element 16.

At this point, it should be mentioned that in the present embodiment examples, the axle 8 of the slat 6 is divided into a first axle element 20, which is associated with the upper bearing point 18, and a second axle element 21, which is associated with the lower bearing point 19. Likewise, the axle 8 could also be formed as a single piece, and could extend from the first bearing point 18 to the second bearing point 19.

The support element 14 is preferably arranged along an extension of the frame 12 configured along the transverse body axis Y in such a manner that force is evenly absorbed in the case of occurring forces F. Furthermore, the support element 14 is designed to support the slat 6, wherein the rotational axis 9 of the slat 6 is received by the support element 14.

The support element 14, which is in the form of a rod and preferably has an aerodynamically shaped cross-section, can be inserted directly into the frame 12, but may also be mounted onto the frame 12 in a clamp-like manner. That is, the support element 14 is structured independently of frame 12 and in such a manner that it can be connected to frame 12. Both options are shown in FIGS. 3 and 8 to 11, and can be arrayed virtually adjacently to one another in frame 12. In other words, both the support element 14 in the inserted version and the support element 14 in the attached version can be associated with the frame 12.

Figure 5:
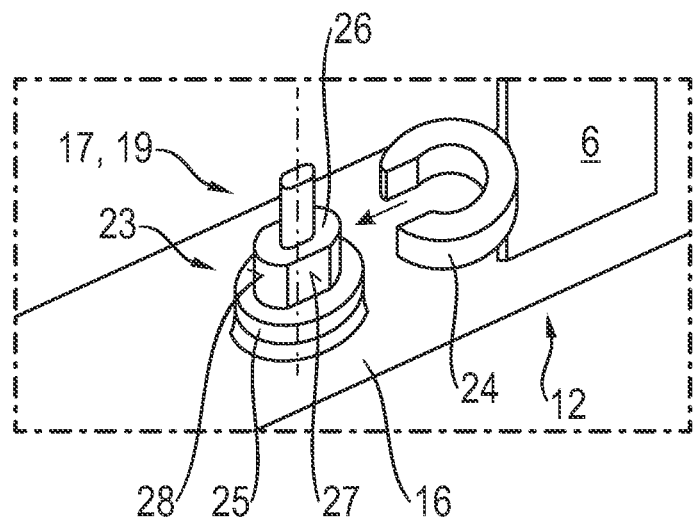
Figure 6:
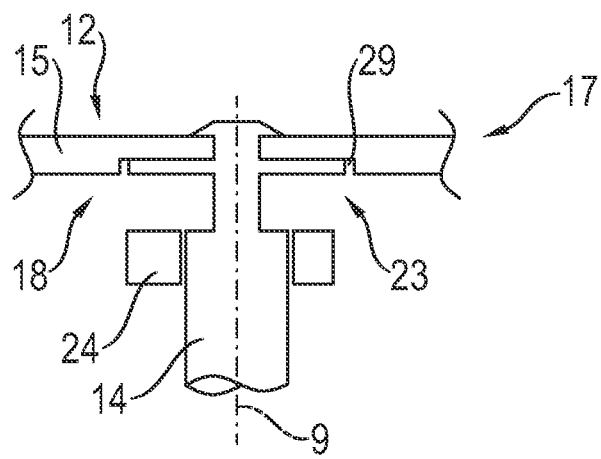
Figure 7:
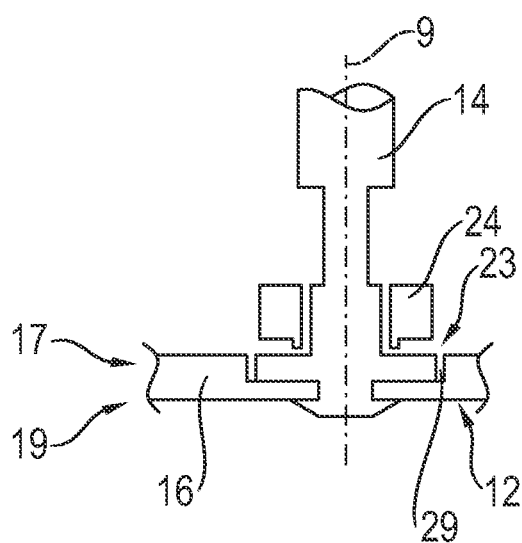

FIGS. 5 to 7 depict the bearing points 18, 19, wherein the lower bearing point 19 is illustrated in an exploded view in FIG. 5; FIG. 6 shows the upper bearing point 18 in a section along the rotational axis 9 of slat 6, and FIG. 7 shows the lower bearing point 19 in a section along the rotational axis 9 of slat 6.

To assemble the slat assembly 5, the upper frame element 15 and the lower frame element 16 possess receiving openings 22, which serve to receive the axle 8 and also to receive the support element 14.

When mounting the slat assembly 5, the slats 6 which are not associated with a support element 14 are first inserted into the frame 12, which is still flexible in this state. Subsequently, the support element 14, which is configured to stabilize the form of frame 12, is mounted. Furthermore, the support element 14 serves to support the fully-assembled slat assembly 5 before it is joined into the entry opening 4. After the support element 14 is mounted, the slats 6 associated with the support elements 14 are connected to the support element 6.

Between the support element 14 and the slat 6, the bearing point 18; 19 is formed, wherein the bearing point 18; 19 comprises a first bearing element 23 and a second bearing element 24, wherein the first bearing element 23 is associated with the support element 14 and the second bearing element 24 is associated with slat 6, wherein the bearing point 18; 19 is configured to receive the second bearing element 24 in a rotationally secure and loss-proof manner by the first bearing element 23.

To connect the slat 6 to the support element 14, the slat 6 comprises the second bearing element 24 in the form of a ring element that is open on one side and, when assembled, the first bearing element 23 in the form of a shoulder that reaches around the support element 14 is slid onto this shoulder 23. The shoulder 23 comprises a bottom element 25, which is arranged opposite to the frame element 15; 16 and is arranged between a receiving element 26 of the shoulder 23 and the frame element 15; 16. In other words, the support element 14 is designed with steps in the area of the bearing point 18; 19. The receiving element 26 comprises two opposite parallel element surfaces 27, which are connected at their ends by means of arc-shaped further element surfaces 28, to bring about a secured connection.

The slat 6 is thus securely received by the support element 14, wherein the described connection can also be referred to as a snap connection, provided that the ring element 24 is at least partially elastic, and can stretch when pushed onto the shoulder 23.

It should be noted that the connection described at this point may be formed at both the upper bearing point 18 and the lower bearing point 19.

In the two FIGS. 6 and 7, the upper bearing point 18 and the lower bearing point 19, respectively, are shown in a section. The support element 14 is positively received in the receiving opening 22, wherein the upper frame element 15 or the lower frame element 16 each possess a receiving groove 29, so that the receiving element 14 can be arranged securely in the frame 12.

In other words, the support element 14, which can be configured to slide on, possesses a clamping element 30 on its ends which is configured to receive the frame element 15; 16, since it is preferably configured to slide onto the upper frame element 15 and on the lower frame element 16. This clamping element 30 can be configured in the form of a snap connection and can also be configured to be securely held in the receiving opening 22, wherein, for example, a pin— which is not shown in further detail—is configured on the clamping element 30, opposite the frame element 18; 19, and engages in the receiving opening 22.

What is claimed is:

1. An air guiding device of a motor vehicle body of a motor vehicle, said air guiding device comprising:
   a frame;
   a slat assembly including at least two slats, wherein each slat is configured to rotate about a respective rotational axis in the frame; and
   at least one support element configured to extend along a rotational axis of one of the slats, the at least one support element being (i) connected to a first frame element of the frame and a second frame element of the frame that is positioned opposite to the first frame element and (ii) configured to limit or prevent deformation of the slat assembly,
   wherein the other slat of the at least two slats is not directly supported by either the support element or a respective support element, the other slat comprising a first axle element being connected to the first frame element of the frame and a second axle element being connected to the second frame element of the frame, wherein the other slat is configured to rotate about a rotational axis defined by the first and second axle elements.

2. The air guiding device according to claim 1, wherein the slats are vertically arranged, and each rotational axis extends along a vertical body axis (Z).

3. The air guiding device according to claim 1, wherein the support element is arranged along the rotational axis.

4. The air guiding device according to claim 1, wherein said one of the slats is mounted onto the support element, and a snap connection exists between said one of the slats and the support element.

5. The air guiding device according to claim 1, wherein the support element is formed independently of the frame and is configured to be connected to the frame.

6. The air guiding device according to claim 5, wherein the support element is configured to slide along the frame.

7. The air guiding device according to claim 5, wherein the support element is configured to slide on the first frame element of the frame and the second frame element of the frame.

8. The air guiding device according to claim 5, wherein the support element is snap connected to the frame.

9. The air guiding device according to claim 1, wherein a positive locking connection exists between the frame and the support element.

10. The air guiding device according to claim 1, wherein the support element at least partially possesses an aerodynamically shaped cross-section.

11. The air guiding device according to claim 1, wherein a bearing point is formed between the support element and said one of the slats, wherein the bearing point comprises a first bearing element and a second bearing element, wherein the first bearing element is associated with the support element and the second bearing element is associated with said one of the slats, wherein the bearing point is configured to receive the second bearing element in a rotationally secure and loss-proof manner by the first bearing element.

12. A motor vehicle comprising the air guiding device of claim 1.

13. A motor vehicle body comprising the air guiding device of claim 1.

14. The air guiding device according to claim 1, wherein the support element is not integrally formed with said one of the slats, and the axle elements are integrally formed with said other slat.

15. The air guiding device according to claim 1, wherein said one of the slats comprises a first rectangular body and wherein the support element is spaced apart from the first rectangular body and wherein said other slat comprises a second rectangular body and wherein the axle elements protrude from the second rectangular body.

16. The air guiding device according to claim 1, wherein each axle element is connected to only one of the first frame element and the second frame element.

17. The air guiding device according to claim 1, wherein said one of the slats and said other slat are synchronously adjustable with the aid of a pushrod.

18. The air guiding device according to claim 1, wherein the first and second frame elements are connected together by two lateral frame elements, wherein each lateral frame element extends parallel to the support element.

19. The air guiding device according to claim 1, wherein the support element comprises a shaft having a first diameter, wherein two ends of the shaft having a second diameter that is greater than the first diameter, and wherein each end of the two ends is seated in a groove that is formed on one of the first and second frame elements.

20. The air guiding device according to claim 1, wherein said one of the slats is clipped onto the at least one support element and the support element is fixed to the first and second frame elements.

\* \* \* \* \*